United States Patent

Anderson, Jr.

[15] 3,702,029
[45] Nov. 7, 1972

[54] VISUAL AID FOR TRAILER HITCH

[72] Inventor: Harold D. Anderson, Jr., Oakesdale, Wash.

[22] Filed: Jan. 28, 1971

[21] Appl. No.: 110,716

[52] U.S. Cl. .............................................. 33/246 AS
[51] Int. Cl. ..............................................G01c 5/00
[58] Field of Search ...................33/46 AS; 116/28 R

[56] References Cited

UNITED STATES PATENTS

| | | | |
|---|---|---|---|
| 2,984,011 | 5/1961 | Hamiton | 33/46 AS |
| 3,159,917 | 12/1964 | Whitehead | 33/46 AS |
| 3,363,318 | 1/1968 | Folkins et al. | 33/46 AS |

*Primary Examiner*—Robert B. Hull
*Attorney*—Norman H. Huff

[57] ABSTRACT

An automotive accessory to assist a driver to accurately back a towing vehicle to align the vehicle-mounted hitch component with the trailer-mounted hitch component when the hitch cannot be seen by the driver wherein an upright rod having a ring-like indicator rotates to indicate fore and aft alignment and a comparison of the relative positions of the vehicle mounted indicator and a trailer-mounted indicator reveals the lateral alignments. The trailer mounted indicator is adjustably mounted to compensate for longitudinal angularity of the vehicle and trailer.

6 Claims, 5 Drawing Figures

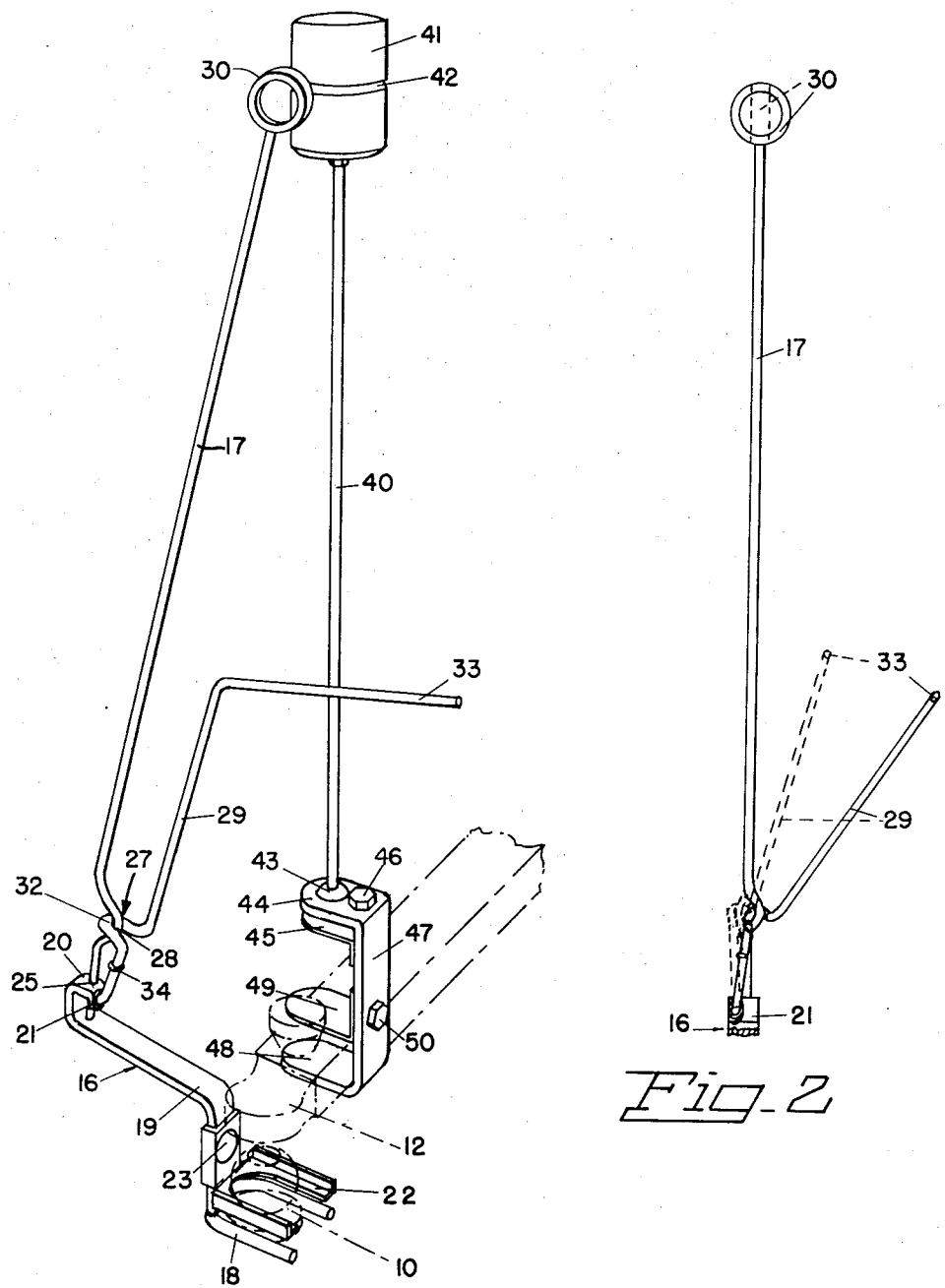

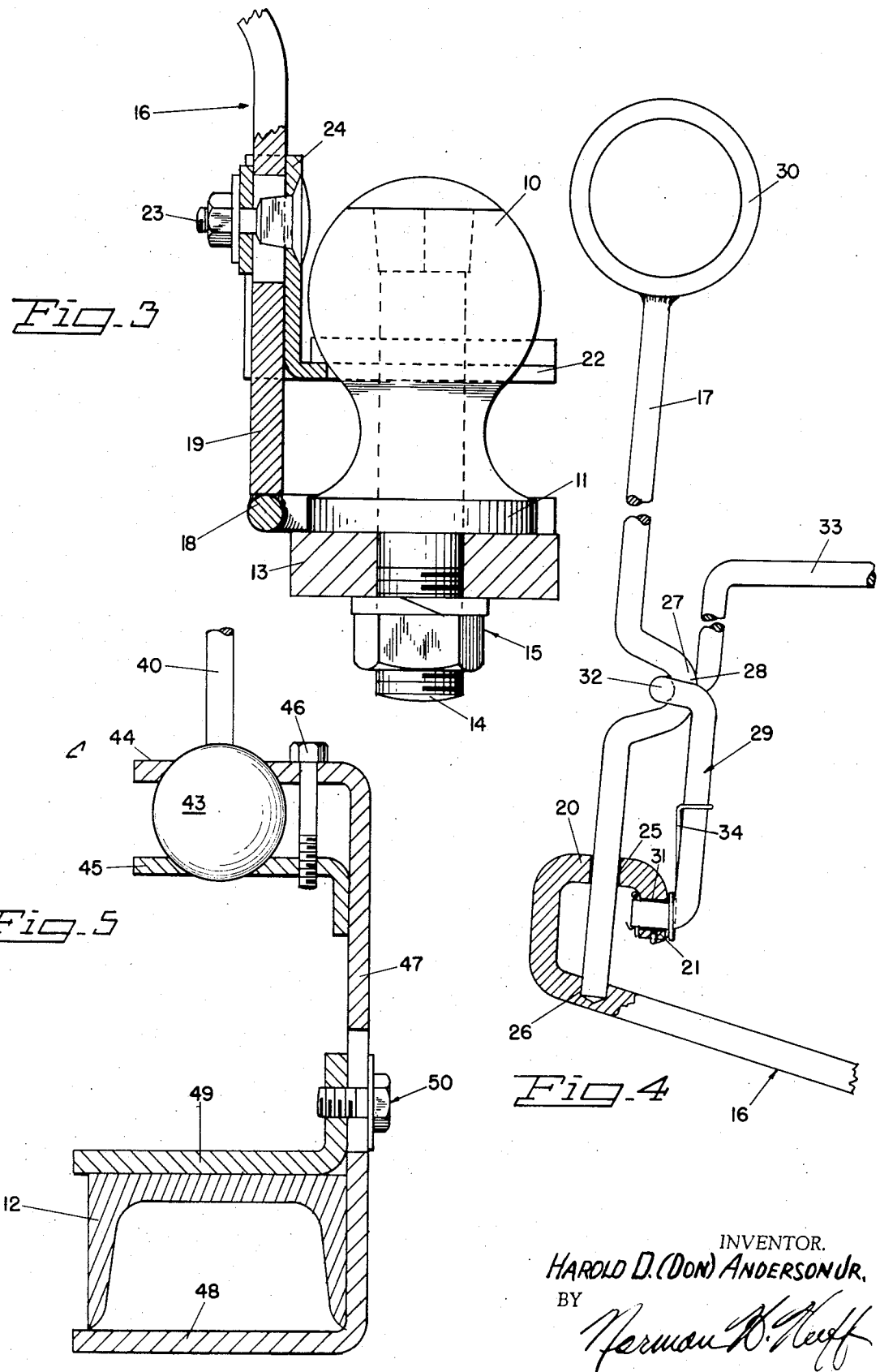

VISUAL AID FOR TRAILER HITCH

My present invention relates generally to automotive accessories and more particularly to a device that may be removably mounted on a vehicle and trailer to visually indicate to the driver of the vehicle when the interlocking portions of the trailer hitch are in vertical alignment and may be engaged.

An object of the present invention is to provide visual guide means by which a driver of a vehicle may back or otherwise maneuver the vehicle into a position where the automotive-supported portion of the hitch is placed in vertical alignment with the trailer-supported hitch portion, with the latter hitch portion being lowerable to receive the vehicle-supported portion of the hitch, which operation can be carried out without the instruction of a second person standing outside the vehicle.

A further object of the invention is to provide a visual guide for a trailer hitch, the first portion of which may be removably mounted on the rear portion of a vehicle without in any way defacing or damaging the surface thereof, with the second hitch section being adapted to be removably mounted relative to the hitch portion of a trailer when needed, and when not in use stored in either the trailer or the automotive vehicle.

Another object of the invention is to supply means which not only indicate when the engaging portion of a trailer hitch is in vertical alignment with the engageable means on an automotive vehicle, but which also indicate that the engaging means on the trailer is at a sufficient elevation relative to the engageable means on the vehicle to permit the engagement thereof.

Yet another object of the invention is to provide a manually adjustable mounting for the trailer-hitch-related indicator which by manipulation may be disposed in a vertical plane common to the two hitch components and the drivers eye even though the longitudinal median of the vehicle may be slightly angular with respect to the longitudinal median of the trailer.

FIG. 1 is a perspective view of my automotive accessory related to a vehicle hitch ball and trailer socket shown in phantom;

FIG. 2 is a vertical side elevation of the vehicle-attached portions viewed from the right of FIG. 1 and showing the support means in section;

FIG. 3 is a vertical lateral section upon an enlarged scale showing the vehicle-portion attaching clamp;

FIG. 4 is an enlarged vertical fragmentary elevation of the vehicle-portion rod and support having parts broken away and sectioned for convenience of illustration; and FIG. 5 is a vertical lateral section of the trailer-portion attaching means.

Referring now more particularly to the drawings, the reference numerals 10 and 12 indicate the two component parts of a conventional "ball and socket" trailer hitch and by inference their respective vehicle and trailer, (not shown).

Customarily, the ball component of the hitch is associated with the towing vehicle, and the socket component of the hitch is secured to the tongue of the trailer. Obviously, they could be reversed if desired. To simplify an understanding of the invention, it is shown and described in the customary setting with the ease of reversal in mind but not hereinafter restated.

The ball 10 is shown as the vehicle hitch component and includes an annular base flange 11 which is supported by a vehicle supported bar 13 bored to receive attaching bolt 14 secured by the usual lock washer and nut combination 15.

The means 16 for supporting the upright shaft 17 comprises a U-shape fixed yoke 18 which is adapted to straddle the flange 11 and be supported by the bar 13. At the bight of the yoke 18 a shaped frame member 19 is welded and extends vertically for a few inches and then is bent to project laterally at an incline and terminate upwardly and outwardly in substantially an open ended box having a top wall 20 and a vertical wall 21. An adjustable yoke 22 is releasably fixed at adjusted positions along the vertical portion of the frame member 19 by means of conventional bolt and nut combination 23 which releasably clamp a vertical ear 24 of the yoke 22 to said frame member with the yokes in spaced parallelism. It is thus demonstrated how the means 16 is releasably attached for quick and easy use and variable to fit balls of differing dimensions within the limits of the physical abilities of the clamp.

Top wall 20 is drilled to form a cylindrical aperture 25 adapted to form a sleeve bearing for the upright shaft 17. The drill is permitted to form a socket 26 in the frame member 19 to receive the lower end portion of the shaft 17 and function as an end-supporting thrust bearing therefor.

Shaft 17 extends upwardly at a slight angle from vertical so that when the yokes 18 and 22 are frictionally engaged with the ball 10, as seen in FIG. 3, the ring-like indicator 30 is disposed substantially in vertical eignment with the ball 10.

Intermediate its length, near its lower end, I provide a bell crank configuration 27 in the shaft 17 which presents an axially offset throw 28 by means of which the shaft may be axially rotated by a substantially horizontal force. To impart this movement, I provide a lever 29 journalled in a bore 31 in the vertical wall 21 and having a laterally extending horizontal bight 32 which engages around or entwines with the crank 27 so that as the lever is tilted in its substantially vertical plane it effects rotation of the shaft 17. At its free end the lever has a pressure bar 33 extending horizontally in a direction to strike and be moved by a member fixed with respect to the trailer hitch component.

In FIG. 5 I have shown the trailer-hitch portion of my visual indicator as comprising an upright rod 40 at the upper end of which is a cylindrical indicator 41 having an annular groove 42 or other visible process midway its length. At its lower end the rod 40 has a ball 43 yieldably held between a fixed and a moveable clamping lip 44 and 45 tensioned by a bolt 46. The force is sufficient to hold the ball against relative movement in the clamp but yieldable to intentional manual force. This allows for the rod to be adjusted to re-position the cylindrical indicator 41 when required as hereinafter disclosed.

The lip 44 is an integral portion of a base member 47 having a lower right angle lip 48 parallel with lip 44 and an intermediate clamping lip 49 adjustably secured relative thereto by bolt 50.

Lips 48 and 49 removably fix the base member 47 with respect to the trailer hitch component 12 and the lengths of the shaft 17 and rod 40 are such as to indicate the hitch components are at exactly the correct relative vertical positions for hitching when the groove 42 bisects the annular opening of the ring 30 as seen from the driver's position.

When the center of the ring 30 as seen by the driver falls on the axis of the cylinder 41, the ball 10 and socket 12 both lie in the median or longitudinal vertical plane of the towing vehicle. The length of lever 29 and the position of bar 33 are such as to rotate the ring as the bar 33 moves by reaction pressure when against rod 40 and so that the plane of the ring 30 is transverse of the axis of the vehicle when the ball and socket fore and aft relationship is correct.

Since it is not always possible to longitudinally align the vehicle and trailer it becomes necessary to back the vehicle at an angle, in this case as they come together, the cylinder may be adjusted into the longitudinal vertical plane coincident to the indicator 30 and the hitch components 10 and 12 and connection may be effected even from an angle.

Spring 34 may be utilized when desired but is normally unnecessary since the angle of bore 31 and configuration of lever 29 can be such that gravity tends to keep the lever in the full line position of FIG. 2. The dotted position of FIG. 2 rotates the indicator 30 to show the proper hitch alignment.

Having thus described my invention I desire to secure by Letters Patent of the United States the following:

1. A visual indicator for assisting the driver of a towing vehicle, having one component of a hitch means at its rear end and out of sight of the driver to maneuver the vehicle toward a trailer, having another component of the hitch means, to vertically align said components, said indicator comprising:

an upright shaft;

means supporting said shaft for rotation about its axis;

the upper end of said shaft having a first indicator movable by reason of rotational movements of said shaft and disposed vertically aligned above the hitch component of said towing vehicle and within the range of sight of its driver;

an actuating lever operable to rotate said shaft upon being moved forwardly of said vehicle;

an upright rod;

means supporting said rod with respect to the hitch component of said trailer;

a second indicator carried by said rod at its upper end and within the range of sight of the vehicle driver and disposed to be substantially level with the first indicator when the hitch components are at relative heights as required for hitching and in the driver's line of sight in a vertical plane through said first indicator when the hitch components are both in the vertical median plane of the towing vehicle, and means on said lever engageable by said rod to rotate said shaft and dispose said first indicator in a predetermined azimuthal aspect when said hitch components are in the same vertical transverse plane of said towing vehicle.

2. The indicator as defined in claim 1 wherein:
the first-named means is secured relative to the vehicle hitch component by a frictional clamping means for quick and easy disconnection.

3. The indicator as defined in claim 2 wherein:
the means supporting said rod comprises a ball and socket connection at the lower end of said rod.

4. The indicator as defined in claim 1 wherein:
the means supporting said rod comprises a ball and socket connection at the lower end of said rod.

5. The indicator as defined in claim 4 wherein:
the first-named means is secured relative to the vehicle hitch component by a frictional clamping means for quick and easy disconnection.

6. The indicator as defined in claim 5 wherein:
said means supporting said rod further comprises:
a releasable clamp for quickly and easily removing said means from attachment with respect to the trailer hitch component.

* * * * *